UNITED STATES PATENT OFFICE.

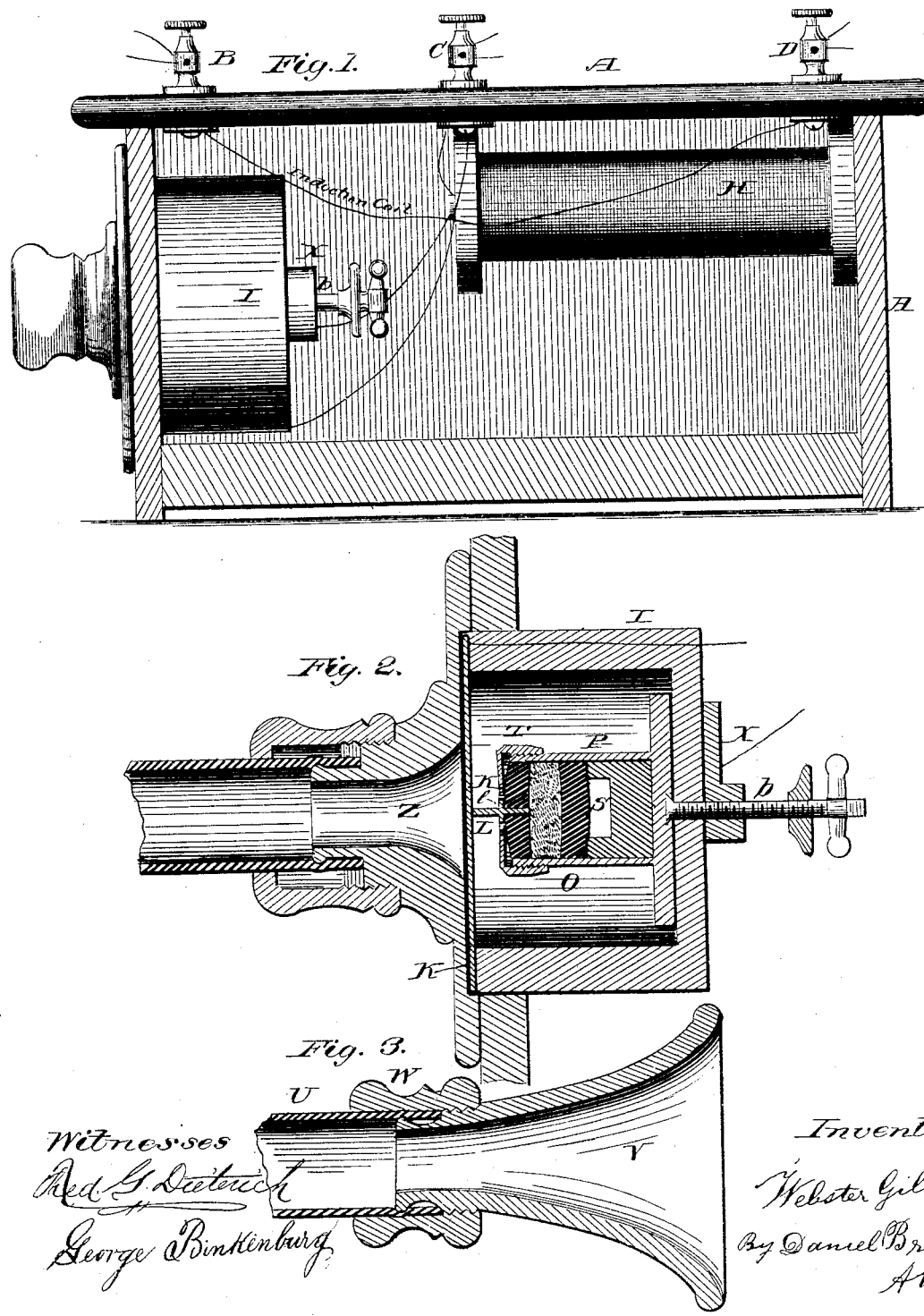

WEBSTER GILLETT, OF YPSILANTI, MICHIGAN.

IMPROVEMENT IN SPEAKING-TELEPHONES.

Specification forming part of Letters Patent No. 213,283, dated March 18, 1879; application filed November 27, 1878.

*To all whom it may concern:*

Be it known that I, WEBSTER GILLETT, of Ypsilanti, in the county of Washtenaw, Michigan, have invented an Improvement in Speaking-Telephones or Acoustic Telegraphs; and I do hereby declare the following to be a full and correct description.

In the accompanying drawings, Figure 1 is a side view of a telegraph-operator's table to which is attached my improvement in telephones, the same showing also an induction-coil, all arranged with a series of posts better to illustrate my improvements in connection with a telegraph. Fig. 2 is a section showing the arrangement of my apparatus detached from the induction-coil and table, Fig. 1. Fig. 3 is a section of my improved mouth-piece and its connection with a speaking-tube.

My invention relates to an acoustic telegraph apparatus or speaking microphones; and my invention consists, first, in a diaphragm provided with a pin with its point in contact with powdered carbon, (or other poor conductor of electric influence,) in combination with a disk of rubber and speaking-tube or acoustic instrument and an induction-coil.

In the accompanying drawings, Fig. 1 is a side view of a telegraph-operator's table, A, with the usual series of binding-posts B C D, &c., and a receiving-magnet, H, all of which require no further description. Below the table A is seen the case I, which contains my improvement, as is better shown in section, Figs. 2 and 3. Across the mouth of the case I is placed a metallic diaphragm, K, having one of the wires connecting therewith, while the other wire is connected with the collar X, as seen in Fig. 2.

The pin L of the diaphragm has a small disk of metal bearing on a piece of india-rubber, while the platinum point of the pin is in contact with the carbon powder O, which is to be more or less compressed between the rubber disks, as will be now explained.

The metallic cylinder P is supported on an adjusting-rod, b, working in the screw-collar X. By this arrangement the cylinder P and its contents can be adjusted at pleasure in relation to the diaphragm K. The bottom of the cylinder P has a chambered disk, upon the rim of which rests a disk of rubber, thus leaving an air-space, S, into which the rubber disk bulges more or less, as shown in Fig. 2.

A cap, T, closes the cylinder and presses more or less on the rubber disk, and through it upon the carbon powder; yet this cap has no contact with the small disk or bearing $l$ on the pin L. By the above construction the carbon powder may be more or less compressed, and thus the compactness of the carbon and its consequent contact with the pin L may be increased or diminished at pleasure; and by the arrangement of the wires in connection with the telegraph-line and the metallic diaphragm K any movement of this diaphragm will deviate or vary the current according to the vibration. The metallic diaphragm K is thicker than those commonly used in similar instruments. The greater thickness of this metallic plate and the two rubber disks which embrace the carbon powder serve to break the backlash and thus prevent the ordinary rattling of the diaphragm when speaking or otherwise transmitting acoustic influence.

The rubber or elastic speaking-tube U is attached to the mouth-piece V by means of a screw-cap, W, which bears against a projection or rounded shoulder of the mouth-piece, as seen in Fig. 3. In like manner this tube is also connected with the cap of the diaphragm K, Fig. 2.

Having described my invention, what I claim, and desire to secure by Letters Patent, is—

In a speaking-telephone or acoustic telegraph, the above-described diaphragm or metallic plate K, having the pin L, provided with a bearing-disk, $l$, and having its point in contact with the pulverized carbon, in combination with the telegraph-wires and the acoustic cap K, substantially as set forth.

WEBSTER GILLETT.

Witnesses:
GEO. F. GRAHAM,
DANIEL BREED.